United States Patent Office 3,085,090
Patented Apr. 9, 1963

3,085,090
6,16-DIALKYL-17-OXYGENATED STEROIDS
Robert P. Graber and Martin B. Meyers, Minneapolis, Minn., assignors to General Mills, Inc., a corporation of Delaware
No Drawing. Filed Mar. 17, 1961, Ser. No. 96,372
18 Claims. (Cl. 260—239.55)

This invention relates to a method of preparation of novel steroid compounds and to novel intermediates encountered therein. In particular the invention relates to the preparation of 6,16-dialkyl-17-oxygenated steroid compounds.

The resulting products, 6,16-dialkyl-17-oxygenated progesterones are unusually active progestational hormones in themselves and are useful as intermediates for further conversion to other progestogens or to cortical hormones.

The invention can best be followed by means of the following schematic representation in which R and R' are alkyl groups having from 1 to 8 carbon atoms and R and R' may be the same or different alkyl groups and the acyl group may take the form

where R''' is an alkyl, cycloalkyl, aralkyl or alkoxyaralkyl group, the alkyl group generally having from 1 to 12 carbon atoms and the aryl group generally being phenyl. Illustrative of such ester groups are the acetate, caproate, cyclopentyl propionates, phenyl propionate, p-propoxyphenyl propionate, p-hexoxyphenyl propionate and p-dodecoxyphenylpropionate. Since the activity of the compound varies dependent on the acylate group in the 17 position, the acylate group in this position may be varied widely to provide the activity desired. As the particular acylate group in positions 3 and 21 have little if any effect on the activity, the acylate groups in this position will generally be those where R''' is an alkyl group having from 1 to 12 carbon atoms.

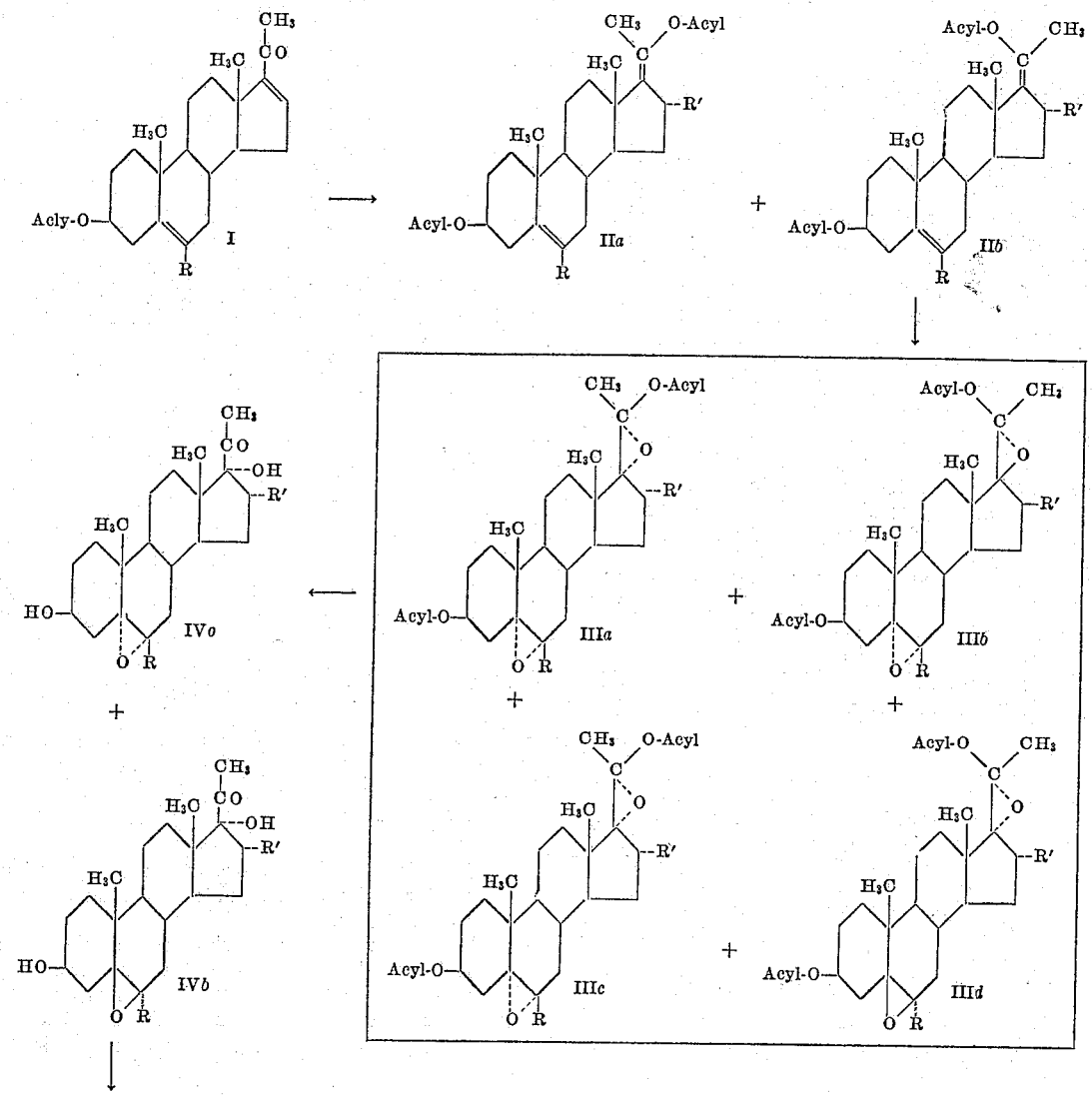

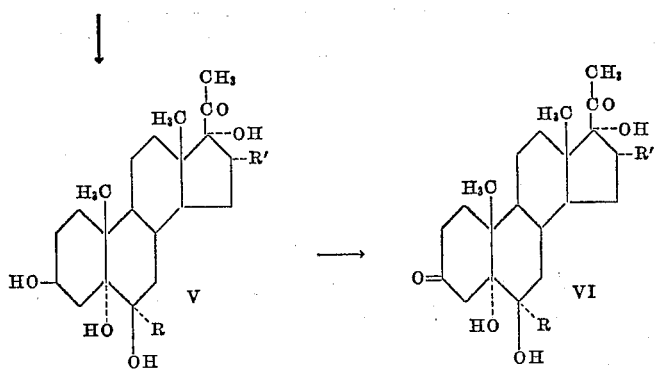
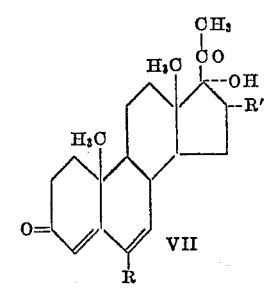
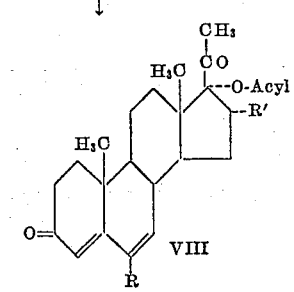

Briefly, the synthetic route described above leads by way of novel intermediates to a series of novel dialkyl-17-oxygenated progesterones of potent biological activity as oral progestational agents. The starting material for this synthesis is a 6-alkyl-16-dehydroprogenenolone either as such or as a 3-ester derivative. The 16-alkyl group and the 17-oxygen function are first introduced by way of Grignard alkylation, which is then followed by enol acylation, epoxidation and hydrolysis. If 6-alkyl-16-dehydropregnenolone itself is employed as the starting material, the enol acylation subsequent to the alkylation will provide a 3-ester derivative. Accordingly it is apparent that either 6-alkyl-16-dehydropregnenolone as such or a 3-ester derivative may be employed as the starting material. From the foregoing reaction scheme it is also apparent that the alkyl groups, R and R' may be the same or different alkyl groups since they are not introduced simultaneously. The epoxidation also introduces a 5,6-oxido function which on subsequent acid hydrolysis, oxidation of the 3-hydroxyl group and double dehydration affords the 6-methyl-$\Delta^{4,6}$-dien-3-one functionality.

It is, therefore, an object of this invention to provide a novel method of preparation of dialkyl-17-oxygenated progesterones.

It is also an object of this invention to provide novel 6,16-dialkyl steroid compound intermediates which may be converted to the progestationally active 6,16-dialkyl-17-oxygenated progesterones.

It is further an object of this invention to provide novel 6,16-dialkyl steroid compounds having the formulae:

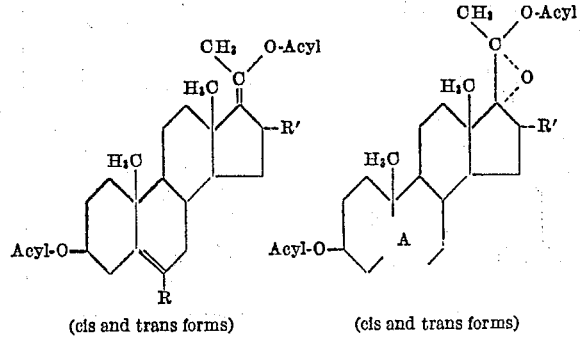

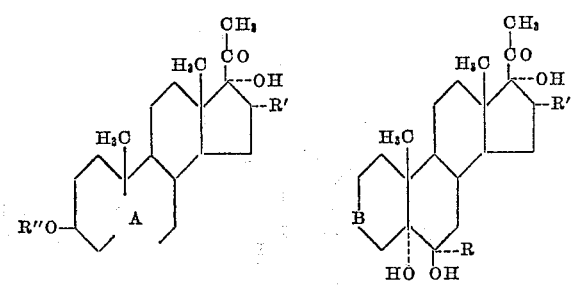

where R and R' are alkyl groups having from 1 to 8 carbon atoms, A is selected from the group consisting of

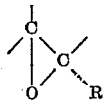

and

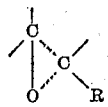

R'' is selected from the group consisting of hydrogen or acyl groups and B is selected from the group consisting of

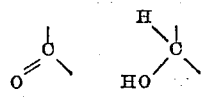

and

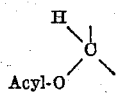

in which the acyl groups are generally acyl radicals of a hydrocarbon carboxylic acid containing from 1 to 12 carbon atoms.

For the purpose of simplicity in illustration, in the following detailed description of the invention, reference will be made only to the dimethyl products and to the acetate esters. As has been pointed out, however, other alkyl groups and ester groups may be employed.

(1) ALKYLATION AND ENOL ACYLATION OF 6-METHYL - 5,16 - PREGNADIEN - 3β-OL-20-ONE 3-ACETATE (I)

Treatment of the above Δ$^{16}$-dehydro-20-ketone compound with methyl Grignard reagent produces an intermediate dimethylated Grignard complex which, without isolation, is treated with an acetylating agent. There is thus produced a mixture of the cis and trans forms of 6,16α-dimethyl-5,17 (20)-pregnadien-3β,20-diol 3,20-diacetate (IIa and IIb).

The reaction is normally carried out with about 2.4 moles of methyl magnesium bromide per mole of Δ$^{16}$-dehydro-20-ketone. As little as 1.5 moles per mole of steroid may be employed. Ratios of greater than 2.4 moles per mole of steroid may be used but no increased beneficial effect is obtained thereby. Other alkyl magnesium bromides may be employed to give other 16-alkylated compounds. Alkyl magnesium iodides and dialkyl magnesium compounds may also be used. The 1,4-addition of the Grignard reagent to the α,β-unsaturated ketone system is catalyzed by the addition of cuprous chloride. Normally the salt is added in a ratio of about 0.1 mole per mole of steroid. Lesser ratios are substantially as effective, but larger ratios show no increased beneficial effect. Other cuprous halides may also be used such as cuprous bromide or cuprous iodide. The solvent mixture normally used is a mixture of ethyl ether and tetrahydrofuran. Dioxane may also be used in place of tetrahydrofuran but the results are less satisfactory.

The reaction is normally carried out under an inert atmosphere such as nitrogen gas for a period of about 45 minutes at about 25° C. Lower temperatures may be employed but then longer reaction times are required. Somewhat higher temperatures and shorter times may also be employed but in these cases some attack of Grignard reagent on the 3-ester function is observed.

After the termination of the Grignard alkylation period, the intermediate Grignard complex is acetylated at about 25° C. by the addition of an acetylating agent. The acetylation agents normally employed are acetyl chloride or acetic anhydride, usually diluted with a solvent such as tetrahydrofuran. Other acylating agents may be used such as propionyl chloride, propionic anhydride and the like. After the acylating agent has been introduced, the mixture is allowed to stir for a period of about 45 minutes at about 25° C.

The reaction mixture is finally treated with saturated aqueous ammonium chloride solution to decompose the excess Grignard reagent. Other ammonium salts may be used and even water alone may be used followed by acidification with, for example, hydrochloric acid. The solvent layer is diluted with ethyl acetate, separated from the aqueous layer, and washed free of inorganic materials. After drying, the solvents are removed in vacuo to give the crude dialkylpregnadiene-diol diacylate. This product is a mixture of cis and trans isomeric forms (IIa and IIb). In practice, these isomers are used without separation. The presence of the desired functionality is indicated by the characteristic infrared spectrum.

(2) EPOXIDATION OF CIS AND TRANS 6,16α-DIMETHYL - 5,17(20) - PREGNADIEN-3β,20-DIOL 3,20-DIACETATE (IIa AND IIb)

The pregnadiendiol diacetate is epoxidized by treatment with a peracid to give the corresponding 5,6:17α,20-dioxido-3,20-diacetoxy compound as a mixture of four isomeric forms (IIIa, IIIb, IIIc and IIId). These forms are the cis and trans 17α,20-oxides corresponding to IIa and IIb each of which is also present as its 5α,6α- and 5β,6β-oxide.

The reaction is normally carried out by treatment with peracetic acid in chloroform solution at room temperature for about five hours. Other peracids may be used such as perbenzoic acid or monoperphthalic acid. When perbenzoic acid is used, the solvents normally used are benzene, toluene or the like. The time of the reaction will depend on the peracid used, longer with perbenzoic acid and even longer with monoperphthalic acid at the same temperature.

At the end of the reaction with peracetic acid, which may be followed if desired by iodometric titration of samples, the reaction mixture is diluted with, for example, methylene chloride, the solvent layer separated and washed thoroughly with aqueous sodium bicarbonate solution and water. After drying, the solvents are removed in vacuo to give the crude mixture of cis-trans and 5,6α- and β-dioxido compounds (IIIa–d). Further reaction is normally carried on without separation. The presence of the desired functional groups is indicated by the characteristic infrared spectrum.

(3) ALKALINE HYDROLYSIS OF THE 5,6:17α,20-DIOXIDO - 6,16α - DIMETHYLPREGNAN-3β,20-DIOL 3,20-DIACETATES (IIIa, IIIb, IIIc, AND IIId)

Hydrolysis of the 3- and 20-acetate groupings to give the mixture of 5α,6α-oxido-6β,16α-dimethylpregnan-3β,17α-diol-20-one and 5β,6β-oxido-6α,16α-dimethyl-pregnan-3β,17α-diol-20-one (IVa and IVb) is carried out with potassium carbonate in aqueous methanol. Under these alkaline conditions, the ester functions at 3 and 20 are removed. The intermediate 17α,20-oxido-20-alcohol thus produced is unstable under the hydrolysis conditions and spontaneously rearranges in situ to the 17α-hydroxy-20-ketone system.

This alkaline hydrolysis-rearrangement is normally carried out by treatment with aqueous methanolic potassium carbonate at the reflux temperature of the mixture. Other alkalis and solvent mixtures may be used, however, for example potassium hydroxide in aqueous ethanol, sodium hydroxide in aqueous methanol or ethanol, or sodium carbonate in aqueous ethanol. Using the stronger bases, the required reflux period is shorter. Also with the stronger bases, the reaction may be carried out at room temperature but substantially longer times are required.

The product is normally isolated by acidification with acetic acid, evaporation in vacuo to remove most of the alcohol solvent, and then extraction of the steroidal material with ethyl acetate or other suitable water immiscible solvents such as chloroform, methylene chloride, and the like. For acidification, other water soluble organic acids may be used and even mineral acids such as hydrochloric acid providing no excess is introduced.

The solvent extracts are washed free of acids and inorganic materials and the solvent removed in vacuo to give the mixture of isomeric 5α,6α- and 5β,6β-oxido-dimethylpregnandiolones (IVa and IVb). Separation of the isomeric 5,6-oxides may be accomplished by a fractional crystallization or by column chromatography on alumina but in practice the mixture of isomers is utilized without separation since they both give the same product in the subsequent step. The characteristic infrared spectrum of the mixture serves to identify the component oxides.

(4) HYDROLYTIC CLEAVAGE OF THE 5,6-OXIDO-6,16α - DIMETHYLPREGNAN - 3β,17α-DIOL-20-ONES (IVa AND IVb)

Acid-catalyzed hydrolytic opening of either of the isomeric 5,6-oxides (IVa and IVb) produces the same trans 5α,6β-diol system. Thus both IVa and IVb give 6α,16α-dimethylpregnan-3β,5α,6β,17α-tetrol-20-one.

Normally this acid-catalyzed hydrolysis is carried out in aqueous acetone containing perchloric acid. The ratio of water to acetone is normally about 3:8 but small variations in this ratio have no material effect in the course of the reaction. The normality of the perchloric acid in the mixture is normally about 0.3 N, but normalities of 0.1 N or less may be used and also normalities as high as 1.0 N are effective. The rate of hydrolysis is dependent on the acid concentration, being slower with lower concentrations and vice versa. When the perchloric acid concentration is about 0.3 N, the reaction is complete in about 45 minutes at about 25° C. Other strong acids such as sulfuric acid or periodic acid may also be used. The concentration, time and temperature will depend somewhat on the particular acid used.

At the end of the reaction period, about 10 volumes of water are added and the precipitated steroid extracted with ethyl acetate. Other solvents such as chloroform, methylene chloride and the like may be used. The solvent extracts are washed thoroughly with water, aqueous sodium bicarbonate or the like, again with water and finally dried. Removal of the solvents in vacuo thus affords the crude crystalline dimethylpregnantetrolone (V). The pure material may be obtained by recrystallization from the usual solvents such as, for example, a mixture of acetone and Skellysolve B, essentially an n-hexane hydrocarbon fraction.

(5) OXIDATION OF 6α,16α-DIMETHYLPREGNAN-3β,5α,6β,17α-TETROL-20-ONE (V)

Selective oxidation of the 3β-alcohol function to the corresponding 3-ketone is normally carried out by treatment of the tetrolone (V) in acetone solution with a solution of chromium trioxide in dilute aqueous sulfuric acid. The reaction is very rapid and is normally complete in about 3 minutes. At the end of this time, the excess chromium trioxide is destroyed and the mixture diluted by the addition of an excess of aqueous sodium sulfite solution. Other ketone solvents, such as methyl ethyl ketone, may be employed providing they are not oxidized themselves. In place of sodium sulfite, other reducing salts such as sodium bisulfite, potassium sulfite and the like may be used. Other oxidizing systems may also be used such as chromium trioxide in acetic acid or chromium trioxide in pyridine.

The product is recovered by extraction with a water-immiscible solvent such as ethyl acetate. Chloroform, methylene chloride, and the like may also be used. The solvent extracts are washed free of inorganic materials and acids with water and aqueous sodium bicarbonate solution then dried and evaporated to dryness in vacuo to give the crude crystalline dimethylpregnanetriol-dione (VI). The pure material is obtained by crystallization from solvent mixtures such as acetone and Skellysolve B.

(6) DEHYDRATION OF 6α,16α-DIMETHYLPREG-NAN-5α,6β,17α-TRIOL-3-20-DIONE (VI)

The 5α,6β-dihydroxy-3-ketone system of compound VI is converted to the Δ$^{4,6}$-diene-3-one system by treatment with an acid in an alcohol solvent. Under these conditions the 5α-hydroxyl and the 6β-hydroxyl groups are eliminated as water to form the 4,6-diene system in 6,16α-dimethyl-4,6-pregnadien-17α-ol-3,20-dione (VII) (Δ$^6$-dehydro-6,16α-dimethyl-17α-hydroxy progesterone), which is identical to the material prepared in our copending application Serial No. 88,030, for 17-Oxygenated-6,16-Dialkyl Progesterones, filed February 9, 1961.

Normally, the dihydroxy ketone (VI) is heated under reflux in ethanol containing a small quantity of concentrated hydrochloric acid for a period of about 40 minutes. Other strong acids may be used such as sulfuric acid, p-toluenesulfonic acid, 2,4-dinitrobenzenesulfonic acid, and the like. Other alcoholic solvents may be used such as methanol or isopropanol. The exact times of reflux will depend on the acid strength of the particular acid used and on the boiling point of the mixture.

The product is recovered by concentrating the reaction mixture in vacuo at about room temperature to remove 70–80% of the solvent. Dilution with 6–10 volumes of water causes precipitation of the crystalline product which is removed by filtration, thoroughly washed with water and dried in vacuo. Recrystallization from Skellysolve B affords the pure product (VII).

(7) ACYLATION OF 6,16α-DIMETHYL-4,6-PREGNA-DIEN-17α-OL-3,20-DIONE (VII)

The 17α-hydroxyl group of VII is acetylated to form 6,16α-dimethyl-4,6-pregnadiene-17α-ol-3,20-dione 17-acetate (VIII), (Δ$^6$-dehydro-6,16α-dimethyl-17α-hydroxy-progesterone acetate) by treatment with acetic anhydride and p-toluenesulfonic acid in glacial acetic acid solution. The reaction is normally carried out at room temperature for periods of 16–72 hours. Other acylating agents may be used such as propionic anhydride, caproic anhydride and the like. When other anhydrides are used to form other acylates, the solvent used must be the acid corresponding to the anhydride. Other acid catalysts such as 2,4-dinitrobenzene sulfonic acid may also be used. The time of the reaction will depend upon the temperature as well as the nature of the reagents and solvents used.

The product is isolated by diluting the reaction mixture with water followed by extraction of the steroid with a solvent such as ethyl acetate, chloroform, methylene chloride or the like. The extracts are washed free of acids by washing with aqueous sodium bicarbonate, then dried and evaporated to dryness in vacuo. The pure 17-acetate or other acylate may be isolated by crystallization from solvents such as Skellysolve B, or by chromatography on alumina.

The crude 17-acetate or other acylate will sometimes contain small amounts of the corresponding ester of the 3-enol. This enol ester can be selectively hydrolyzed by treatment with a small amount of hydrochloride acid in methanol solution. Under these conditions, the 3-enol ester is selectively hydrolyzed to the original 3-ketone function leaving the 17-acetate or other acylate function intact. Other strong acids and other alcoholic solvents may also be employed.

The acidic methanol mixture is diluted with water to precipitate the desired 17-acetate or other acylate. The product is normally precipitated as a solid and can be removed by filtration. In some instances, the product is not crystalline and is then extracted with a solvent such as ethyl acetate, chloroform, methylene chloride, and the like. Final purification of the 17-acetate or other acylate is accompanied by crystallization from Skellysolve B or the like.

This product, Δ$^6$-dehydro-6,16α-dimethyl-17α-hydroxy-progesterone acetate may be further dehydrogenated to provide the Δ$^{1,6}$-bisdehydro derivative by a variety of reactions as disclosed in our copending application Serial No. 88,030 for 17-Oxygenated-6,16-Dialkyl Progesterones filed on February 9, 1961. As disclosed therein, the Δ$^1$-double bond may be introduced into ring A of the nucleus by the use of chloranil in refluxing sec-amyl alcohol. The Δ$^1$-double bond may also be introduced selectively by the dehydrogenating action of selenium dioxide, by fermentation with certain species of microorganisms or by treatment with 2,3-dichloro-5,6-dicyanobenzoquinone.

Representative of the starting material is 6-methyl-5,16-pregnadien-3β-ol-20-one 3-acetate shown generically as Formula I in the preceding schematic representation. This starting material may be prepared in accordance with U.S. Patent No. 2,871,246.

The invention can best be illustrated by means of the following examples which are intended as illustrative of the process and products of the present invention, but are not to be construed as limiting the invention.

*Example I*

ALKYLATION AND ENOL ACETYLATION OF 6-METHYL-5,16-PREGNADIEN-3β-OL-20-ONE 3-ACETATE (I)

To 50 ml. of dry tetrahydrofuran under nitrogen was added 8 ml. of a 3 M solution of methyl magnesium bromide in ether. After removing 28 ml. of the mixture by distillation and cooling to room temperature, 200 mg. of cuprous chloride was added. With stirring a solution of 3.70 g. of 6-methyl-5,16-pregnadien-3β-ol-20-one acetate in 30 ml. of tetrahydrofuran was introduced in a 2 minute period. The green mixture was stirred for 45 minutes at room temperature and then a solution of 1.5 ml. of acetyl chloride in 10 ml. of tetrahydrofuran was introduced. Stirring was continued for 45 minutes and then 60 ml. of saturated aqueous ammonium chloride solution was added. The organic layer was diluted with ethyl acetate and washed twice with saturated sodium chloride solution, dried, and evaporated in vacuo to an oil which had $\lambda_{max.}^{CCl_4}$ 5.74, 5.90 (shoulder), 8.1–8.2, 8.41 and 8.65μ and corresponded to a mixture of cis and trans 6,16α-dimethyl - 5,17(20) - pregnadien-3β,20-diol 3,20-diacetate (IIa and IIb).

Example II

EPOXIDATION OF CIS AND TRANS 6,16α-DIMETHYL-5,17(20)-PREGNADIEN - 3β,20 - DIOL 3,20 - DIACETATE (IIa AND IIb)

The crude cis and trans 6,16α-dimethyl-5,17(20)-pregnadien-3β,20-diol 3,20-diacetate (IIa and IIb), 4.5 g., was dissolved in 30 ml. of chloroform and added to a stirred mixture of 10 ml. of 40% peracetic acid and 1.0 g. of anhydrous sodium acetate. The reaction mixture was stirred for five hours at room temperature, then poured into water and diluted with methylene chloride. The organic layer was washed with 5% aqueous sodium bicarbonate solution, once with water and finally with saturated sodium chloride solution, dried and evaporated to a solid which was a mixture consisting of cis- and trans-5α,6α:17α,20-dioxido-6β,16α-dimethylpregnan 3β,20-diol 3, 20-diacetates and cis- and trans - 5β,6β:17α,20-dioxido-6α,16α-dimethylpregnan - 3β, 20-diol 3,20-diacetates (IIIa and IIIb, IIIc and IIId) having $\lambda_{max.}^{CCl_4}$ 5.74, 8.13, 8.60 and 8.88μ

Example III

ALKALINE HYDROLYSIS OF THE 5,6:17α,20-DIOXIDO-6,16α - DIMETHYLPREGNAN - 3β,20 - DIOL 3,20 - DIACETATES (IIIa, IIIb, IIIc AND IIId)

The mixture of 5,6:17,20-diepoxides from Example II (4.9 g.) was taken up in 100 ml. of methanol to which was added a solution of 2.0 g. of potassium carbonate in 25 ml. of water. The mixture was heated under reflux for 45 minutes, then cooled and 2 ml. of glacial acetic acid added. After concentrating the mixture in vacuo to about ⅓ of the original volume, 200 ml. of water was added and the resulting precipitate removed by filtration, washed and dried to give 3.2 g. of a mixture of 5α,6α - oxido-6β,16α-dimethylpregnan-3β,17α-diol-20-one (IVa) and 5β,6β-oxido-6α,16α-dimethylpregnan-3β,17α-diol-20-one (IVb) which had $\lambda_{max.}^{KBr}$ 2.90, 5.90 and 11.60μ

Example IV

HYDROLYTIC CLEAVAGE OF THE 5,6-OXIDO-6,16α-DIMETHYLPREGNAN-3β,17α-DIOL-20-ONES (IVa AND IVb)

A 3.2 g. sample of the mixed 5α,6α- and 5β,6β-oxido-6,16α-dimethylpregnan-3β,17α-diol - 20 - ones (IVa and IVb) was dissolved in 80 ml. of acetone. With stirring, 30 ml. of a 1 N aqueous perchloric acid solution was added. After 45 minutes had elapsed, one liter of water was added and the resulting suspension extracted with two 100 ml. portions of ethyl acetate. The extracts were washed with water, once with 5% aqueous sodium bicarbonate solution and finally with saturated sodium chloride solution, dried and evaporated in vacuo to a solid, 6α,16α-dimethyl-pregnan-3β,5α,6β,17α-tetrol-20-one (V), which had a melting point of about 130–135°. Recrystallization from acetone-Skellysolve B gave amorphous material changing to a microcrystalline form at 131–139°, finally melting at 209–215°, $[\alpha]_D^{29}$ —10.7° (dioxane), $\lambda_{max.}^{KBr}$ 2.90, 5.86 and 9.48μ

Example V

OXIDATION OF 6α,16α-DIMETHYLPREGNAN-3β,5α,6β-17α-TETROL-20-ONE (V)

To a solution of 6.2 g. of 6α,16α-dimethylpregnan-3β,5α,6β,17α-tetrol-20-one (V) in 120 ml. of acetone was added in 60 seconds, with stirring, 12 ml. of an 8 N chromic acid solution, prepared as follows: 5.34 g. of chromium trioxide was dissolved in a mixture of 20 ml. of water and 4 ml. of concentrated sulfuric acid. After three minutes total elapsed time there was added a solution of 5 g. of sodium sulfite in 15 ml. of water. Ethyl acetate was added, the organic layer separated and washed with saturated sodium chloride solution, once with 5% aqueous sodium bicarbonate solution, again with saturated sodium chloride solution, dried and evaporated in vacuo to a solid, weight 5.2 g. Recrystallization from acetone-Skellysolve B gave 6α,16α-dimethylpregnan-5α,6β,17α-triol-3,20-dione (VI) melting at about 225–233°. Further recrystallization from acetone-Skellysolve B raised the melting point to 231.5–234.5, $[\alpha]_D^{29}$ —2.9° (dioxane), $\lambda_{max.}^{KBr}$ 2.90, 5.90μ

Example VI

DEHYDRATION OF 6α,16α-DIMETHYLPREGNAN-5α,6β,17α-TRIOL-3,20-DIONE (VI)

To a solution of 0.53 g. of 6α,16α-dimethylpregnan-5α,6β,17α-triol-3,20-dione (VI) in 50 ml. of absolute ethanol was added 0.2 ml. of concentrated hydrochloric acid. The solution was heated under reflux for 40 minutes, then cooled and evaporated in vacuo to about 10 ml., and 60 ml. of water added. The precipitated solid was removed by filtration and dried giving 0.41 g. of 6,16α-dimethyl-4,6-pregnadien-17α-ol-3,20-dione (VII) melting over the range of 204–228°. Several recrystallizations from Skellysolve B raised the melting point to 220.5–229°, $[\alpha]_D^{29}$ +27.9° (chloroform), $\lambda_{max.}^{EtOH}$ 2.90 mμ (ε 23,200), $\lambda_{max.}^{CCl_4}$ 5.83, 5.90, 5.99, 6.13 and 6.29μ

Example VII

ACETYLATION OF 6,16α-DIMETHYL-4,6-PREGNADIEN-17α-OL-3,20-DIONE (VII)

To a solution of 0.38 g. of 6,16α-dimethyl-4,6-pregnadien-17α-ol-3,20-dione (VII) in 20 ml. of glacial acetic acid was added 2.0 ml. of acetic anhydride followed by 0.15 g. of p-toluenesulfonic acid. After standing for 22 hours at room temperature the mixture was poured into 300 ml. of water. The oil which separated was extracted with ethyl acetate. The extracts were washed with 5% aqueous sodium bicarbonate solution and saturated sodium chloride solution, dried and evaporated in vacuo to an oil. This oil was taken up in 20 ml. of methanol and 0.2 ml. of concentrated hydrochloric acid added. After standing for 2 hours at room temperature 100 ml. of water was added and the resulting precipitate removed by filtration giving 0.40 g. of 6,16α-dimethyl-4,6-pregnadien-17α-ol-3,20-dione 17-acetate melting at about 163–180°. Several recrystallizations from Skellysolve B raised the melting point to 189.5–195°, $[\alpha]_D^{26}$+25.6° (chloroform), $\lambda_{max.}^{EtOH}$ 288 mμ (ε 24,900), $\lambda_{max.}^{CCl_4}$ +cs₂ 5.73, 5.83, 6.00, 6.14, 6.30, 8.03 and 11.39μ

Example VIII

PREPARATION OF Δ⁶-DEHYDRO-6,16α-DIMETHYL-17α-HYDROXYPROGESTERONE CAPROATE

To 1.1 g. of Δ⁶-dehydro-6,16α-dimethyl-17α-hydroxyprogesterone (VII) was added 50 ml. of n-hexanoic acid and 15 ml. of n-hexanoic anhydride. After flushing with nitrogen, 0.85 g. of p-toluenesulfonic acid monohydrate was added and the mixture stirred for 66 hours at room temperature. Five ml. of pyridine was then added and the mixture steam distilled until no more oily distillate appeared. The suspension of oily product remaining was extracted with ethyl acetate and the extracts were washed as follows: once with dilute hydrochloric acid, once with water, once with 5% aqueous sodium bicarbonate solution and once with saturated sodium chloride solution. After drying, the solvent was evaporated in vacuo to give an oil.

The oil was taken up in 50 ml. of methanol and 0.5 ml. of concentrated hydrochloric acid added. After standing for 2 hours the mixture was diluted with water and extracted with ethyl acetate. The extracts were washed with saturated sodium chloride solution, dried and evaporated in vacuo to an oil which was dissolved in Skellysolve B and placed on 30 g. of alumina. Mixtures of Skellysolve B and benzene eluted the $\Delta^6$-dehydro-6,16α-dimethyl-17α-hydroxyprogesterone caproate as an oil, 1.16 g. The purified oily caproate was distilled at 0.04 mm. of mercury and 199–204° bath temperature to give a glassy solid, $[\alpha]_D^{29}+7.4°$ (1%, CHCl$_3$)

$\lambda_{max.}^{EtOH}$ 290 m$\mu$ ($\epsilon$ 22,800), $\lambda_{max.}^{CCl_4}$ 5.76, 5.85, 6.02, 6.15, 8.58 and 11.38 m$\mu$ It is to be understood that the invention is not to be limited to the exact details of operation or the exact compounds shown and described, as obvious modifications and equivalents will be apparent to those skilled in the art and the invention is to be limited only by the scope of the appended claims.

The embodiments of the invention in which an exclusive property or privilege is claimed are defined as follows:

1. A 6,16-dialkyl steroid compound selected from the group consisting of the cis and trans forms of

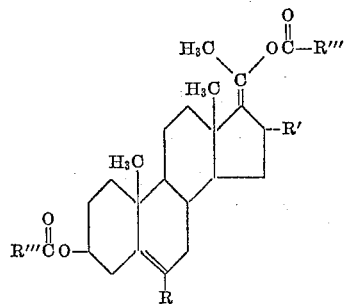

where R and R' are alkyl groups having from 1 to 8 carbon atoms and R''' is an alkyl group having from 1 to 12 carbon atoms.

2. A 6,16-dialkyl steroid compound as defined in claim 1 where R is methyl.
3. A 6,16-dialkyl steroid compound as defined in claim 1 where R' is methyl.
4. A 6,16-dialkyl steroid compound selected from the group consisting of the cis and trans forms of

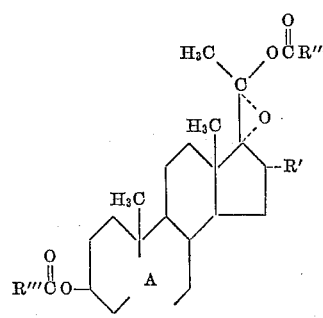

where A is selected from the group consisting of

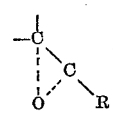

and

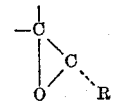

R and R' are alkyl groups having from 1 to 8 carbon atoms and R''' is an alkyl group having from 1 to 12 carbon atoms.

5. A 6,16-dialkyl steroid compound as defined in claim 4 wherein R is methyl.
6. A 6,16-dialkyl steroid compound as defined in claim 4 wherein R' is methyl.
7. A 6,16-dialkyl steroid compound having the formula

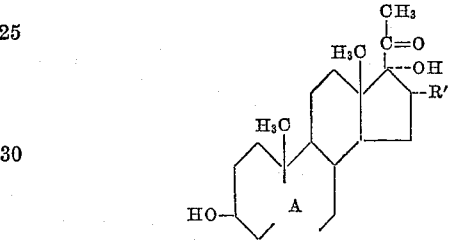

where A is selected from the group consisting of

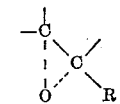

and

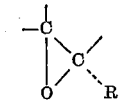

and R and R' are alkyl groups having from 1 to 8 carbon atoms.

8. A 6,16-dialkyl steroid compound as defined in claim 7 wherein R is methyl.
9. A 6,16-dialkyl steroid compound as defined in claim 7 wherein R' is methyl.
10. A 6,16-dialkyl steroid compound having the formula

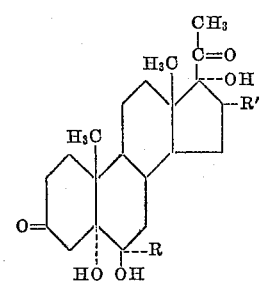

where R and R' are alkyl groups having from 1 to 8 carbon atoms.

11. A 6,16-dialkyl steroid compound as defined in claim 10 wherein R is methyl.
12. A 6,16-dialkyl steroid compound as defined in claim 10 wherein R' is methyl.

13. In a process of preparing 6,16-dialkyl-17-oxygenated-6-dehydro progesterone compounds the sequence of steps comprising (A) alkylating a 6-alkyl-5,16-pregnadien-3β-ol-20-one 3 acylate with an alkyl metal halide, (B) acylating the product of (A), (C) epoxidizing said acylated product with a peracid to provide the 5,6:17,20-dioxido compound, (D) hydrolyzing said dioxido compound under alkaline conditions to provide the 5,6-oxido-3,17-ol 20-one compounds, (E) hydrolyzing the product of (D) under acid conditions to provide the 5,6-diol, (F) oxidizing the 3-hydroxy function to a ketone function, and (G) dehydrating the product of (F) to provide the 6,16-dialkyl-17-oxygenated-6-dehydro progesterone compound.

14. In a process of preparing 6,16α-dialkyl-4,6-pregnadien-17α-ol-3,20-dione from a 6-alkyl-5,16-pregnadien-3β-ol-20-one 3 acylate the step of epoxidizing with a peracid a 6,16α - dialkyl - 5,17(20) - pregnadien-3β,20-diol 3,20-diacylate.

15. In a process of preparing a 6,16α-dialkyl-4,6-pregnadien-17α-ol-3,20-dione from a 6-alkyl-5,16-pregnadien-3β-ol-20-one 3 acylate the steps of hydrolyzing under alkaline conditions a 5,6:17α,20-dioxido-6,16α-dialkylpregnan-3β,20-diol 3,20-diacylate and subsequently hydrolyzing the product thereof under acid conditions.

16. A 6,16-dialkyl steroid compound having the formula

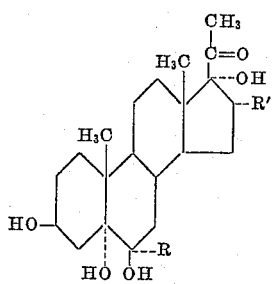

where R and R' are alkyl groups having from 1 to 8 carbon atoms.

17. A 6,16-dialkyl steroid compound as defined in claim 16 in which R is methyl.

18. A 6,16-dialkyl steroid compound as defined in claim 16 in which R' is methyl.

References Cited in the file of this patent
UNITED STATES PATENTS

| | | |
|---|---|---|
| 2,871,246 | Loken | Jan. 27, 1959 |
| 2,944,070 | Kollonitsch et al. | July 5, 1960 |